United States Patent
Agarwal et al.

(10) Patent No.: US 10,346,793 B2
(45) Date of Patent: Jul. 9, 2019

(54) SYSTEMS AND METHODS FOR ORDER FILLING

(71) Applicant: Wal-Mart Stores, Inc., Bentonville, AR (US)

(72) Inventors: Gaurav Agarwal, Santa Clara, CA (US); Devadas Pattathil, San Jose, CA (US); Rahul Ramkumar, Bangalore (IN)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/011,096

(22) Filed: Jan. 29, 2016

(65) Prior Publication Data

US 2017/0220984 A1    Aug. 3, 2017

(51) Int. Cl.
*G06Q 10/08*    (2012.01)

(52) U.S. Cl.
CPC ....... *G06Q 10/087* (2013.01); *G06Q 10/0833* (2013.01)

(58) Field of Classification Search
CPC .......................... G06Q 10/087; G06Q 10/0833
USPC .......................................................... 705/28
See application file for complete search history.

(56) References Cited

U.S. PATENT DOCUMENTS

| | | | | |
|---|---|---|---|---|
| 6,327,576 B1 * | 12/2001 | Ogasawara | ............ | G06K 17/00 705/22 |
| 6,505,093 B1 | 1/2003 | Thatcher et al. | | |
| 6,963,851 B1 * | 11/2005 | Szabo | .................... | G06Q 30/02 186/56 |
| 8,055,377 B2 * | 11/2011 | Yair | ...................... | G06Q 10/087 414/273 |
| 8,478,649 B2 * | 7/2013 | Von Helmolt | ......... | G06Q 10/06 705/22 |
| 8,751,334 B2 * | 6/2014 | Wijaya | ................. | G06Q 10/087 705/26.43 |
| 9,082,148 B1 * | 7/2015 | Oczkowski | ........ | G06Q 30/0641 |
| 9,324,106 B2 * | 4/2016 | Argue | ................ | G06Q 30/0639 |
| 9,741,007 B1 * | 8/2017 | Rouaix | ................... | G06Q 10/08 |
| 9,805,333 B1 * | 10/2017 | Bergstrom | ............ | G06Q 10/04 |
| 2001/0042135 A1 * | 11/2001 | Lewis | .................... | G06Q 50/24 709/246 |
| 2002/0161593 A1 * | 10/2002 | Williams | ............... | G06Q 10/08 700/216 |
| 2002/0174021 A1 * | 11/2002 | Chu | ..................... | G06Q 10/063 705/7.11 |

(Continued)

*Primary Examiner* — Ashford S Hayles
(74) *Attorney, Agent, or Firm* — Bryan Cave Leighton Paisner LLP

(57) ABSTRACT

In some embodiments, a method can comprise receiving a request for one or more orders, and analyzing the one or more orders. Each of the one or more orders can comprise one or more items and at least a portion of the one or more items are available at a warehouse. The method can further comprise determining one or more pick lists based at least in part on the analyzing the one or more orders and also based at least in part on an inventory layout of the warehouse, determining a first route for a first pick list of the one or more pick lists, and determining a second route for a second pick list of the one or more pick lists, wherein the first pick list and the second pick list each comprise a first common item. Other embodiments of related methods and systems are also provided.

20 Claims, 7 Drawing Sheets

(56) References Cited

U.S. PATENT DOCUMENTS

| | | | |
|---|---|---|---|
| 2003/0014321 A1* | 1/2003 | Stern | G06Q 30/02 705/26.8 |
| 2003/0171944 A1* | 9/2003 | Fine | G06Q 30/06 705/2 |
| 2003/0172007 A1* | 9/2003 | Helmolt | G06Q 10/06316 705/28 |
| 2003/0177072 A1* | 9/2003 | Bared | G06Q 30/06 705/26.81 |
| 2004/0068443 A1* | 4/2004 | Hopson | G06Q 10/02 705/5 |
| 2004/0093274 A1* | 5/2004 | Vanska | G01C 21/20 705/26.7 |
| 2004/0098286 A1* | 5/2004 | Zimmerman | G06F 19/325 705/2 |
| 2004/0117276 A1* | 6/2004 | Kettler, III | G06Q 10/0875 705/29 |
| 2004/0199401 A1* | 10/2004 | Wagner | B07C 7/005 235/385 |
| 2005/0102203 A1* | 5/2005 | Keong | G06Q 10/087 705/28 |
| 2005/0160014 A1* | 7/2005 | Moss | G06Q 30/00 705/26.61 |
| 2006/0182085 A1* | 8/2006 | Sweeney | G06Q 10/087 370/352 |
| 2007/0061295 A1* | 3/2007 | Burke | G06F 17/30398 |
| 2008/0077511 A1* | 3/2008 | Zimmerman | G06Q 10/00 705/28 |
| 2010/0306080 A1* | 12/2010 | Trandal | G06Q 10/10 705/26.8 |
| 2011/0035247 A1* | 2/2011 | Perry | G06Q 10/06 705/7.38 |
| 2011/0276364 A1* | 11/2011 | Bergstrom | G06Q 10/04 705/7.29 |
| 2011/0309228 A1* | 12/2011 | Cox | A47F 1/06 248/573 |
| 2012/0030067 A1* | 2/2012 | Pothukuchi | G06Q 10/08 705/26.81 |
| 2012/0158529 A1* | 6/2012 | Edwards | G06Q 20/20 705/23 |
| 2013/0103397 A1* | 4/2013 | Almaer | G10L 15/20 704/233 |
| 2013/0144763 A1* | 6/2013 | Skyberg | G06Q 50/28 705/27.1 |
| 2014/0095350 A1* | 4/2014 | Carr | G06Q 10/083 705/26.8 |
| 2014/0108194 A1* | 4/2014 | Goulart | G06Q 30/0633 705/26.8 |
| 2014/0279151 A1* | 9/2014 | Seid | G06Q 30/08 705/26.3 |
| 2014/0279294 A1* | 9/2014 | Field-Darragh | G06Q 10/087 705/28 |
| 2014/0344953 A1* | 11/2014 | Roundtree | G06F 21/10 726/28 |
| 2015/0081088 A1* | 3/2015 | Lyon | G06Q 10/0875 700/216 |
| 2015/0081474 A1* | 3/2015 | Kostka | G06Q 30/0633 705/26.8 |
| 2015/0120514 A1* | 4/2015 | Deshpande | G06Q 10/08355 705/28 |
| 2015/0206224 A1* | 7/2015 | Ouimet | G06Q 30/0251 705/14.49 |
| 2015/0293356 A1* | 10/2015 | Grigg | G02B 27/017 345/8 |
| 2015/0339625 A1* | 11/2015 | Agasti | G06Q 10/0836 705/26.81 |
| 2016/0063604 A1* | 3/2016 | Shaffer | G06F 16/29 705/14.57 |
| 2016/0171432 A1* | 6/2016 | Pugh | G06Q 10/087 705/14.23 |
| 2016/0189286 A1* | 6/2016 | Zohar | G06K 9/00355 348/150 |
| 2016/0260161 A1* | 9/2016 | Atchley | B66F 9/063 |

* cited by examiner

SYSTEMS AND METHODS FOR ORDER FILLING

TECHNICAL FIELD

This disclosure relates generally to systems and methods for order filling, and relates more particularly to systems to organize orders, determine order pick lists, and update the order pick lists, and related methods.

BACKGROUND

Currently, orders for items or products placed online through an electronic commerce website (eCommerce) can be filled by being picked in a warehouse, store, or distribution center. For these orders, picking is typically performed manually by people who are referred to as pickers. Typically, each picker loads a pick list that consists of multiple items. Once the picker reaches the location of an item on the pick list, the picker either picks the item from the shelf and marked the item as "picked" on the pick list, or if the item is not available, the picker marks the item as "null" on the pick list. When the picker goes to a location and that item is not available, the picking time required to complete the pick list is unnecessarily lengthened. Furthermore, when the same unavailable item is present in more than one pick list for more than one picker, a lot of time can be wasted. Accordingly, there is a need for systems and methods to provide better order filling for items in a pick list.

BRIEF DESCRIPTION OF THE DRAWINGS

To facilitate further description of the embodiments, the following drawings are provided in which.

To facilitate further description of the embodiments, the following drawings are provided in which.

Figure 1:
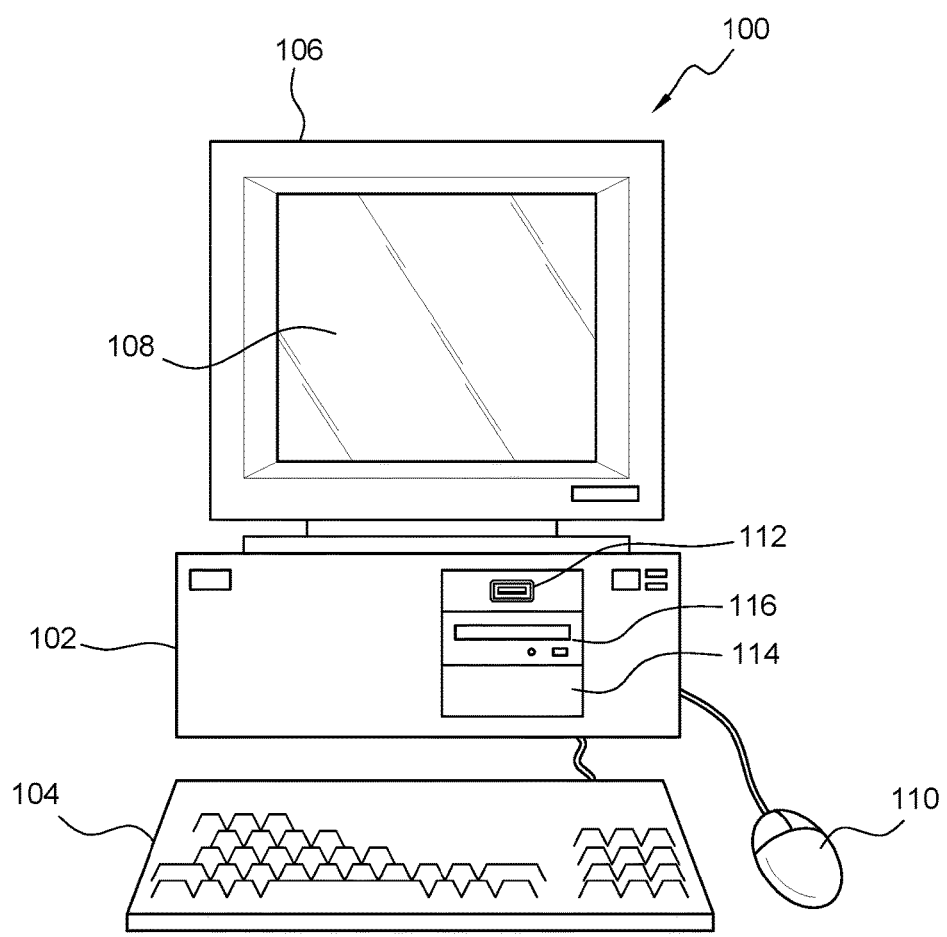
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments can include a system. In many embodiments, the system can comprise one or more processing modules, one or more mobile devices, and one or more non-transitory storage modules storing computing instructions configured to run on the one or more processing modules and perform the acts of retrieving an inventory layout of a warehouse and receiving a request for one or more orders, each of the one or more orders comprise one or more items, at least a portion of the one or more items are available at the warehouse. In many embodiments, the one or more non-transitory storage modules storing computing instructions can be further configured to run on the one or more processing modules and perform the acts of analyzing the one or more orders, determining one or more pick lists based at least in part on the analyzing the one or more orders and also based at least in part on the inventory layout of the warehouse, determining a first route for a first pick list of the one or more pick lists, and determining a second route for a second pick list of the one or more pick lists, wherein the first pick list and the second pick list each comprise a first common item of the one or more items. The one or more non-transitory storage modules storing computing instructions can be further configured to run on the one or more processing modules and perform the acts of transferring the first route and the first pick list of the one or more pick lists to a first mobile device, transferring the second route and the second pick list of the one or more pick lists to a second mobile device, determining that the first common item is not available at the warehouse, and determining a substitute item for the first common item of the first pick list. In many embodiments, the one or more non-transitory storage modules storing computing instructions can be further configured to run on the one or more processing modules and perform the acts of updating the first route based at least in part on including the substitute item and updating the second route based at least in part on the determining that the first common item is not available.

Some embodiments include a method. In some embodiments, a method can comprise retrieving an inventory layout of a warehouse, receiving a request for one or more orders, and analyzing the one or more orders. Each of the one or more orders can comprise one or more items and at least a portion of the one or more items are available at the warehouse. In many embodiments, the method can further comprise determining one or more pick lists based at least in part on the analyzing the one or more orders and also based at least in part on the inventory layout of the warehouse, determining a first route for a first pick list of the one or more pick lists, and determining a second route for a second pick list of the one or more pick lists, wherein the first pick list and the second pick list each comprise a first common item of the one or more items. In some embodiments, the method can comprise transferring the first route and the first pick list of the one or more pick lists to a first mobile device and transferring the second route and the second pick list of the one or more pick lists to a second mobile device. The method can further comprise determining that the first common item is not available at the warehouse, determining a substitute item for the first common item of the first pick list, updating the first route based at least in part on including the substitute item, and updating the second route based at least in part on the determining that the first common item is not available.

Various embodiments of systems and methods for order filling can include a method comprising analyzing one or more orders received from a website, the one or more orders comprising one or more items, determining one or more pick lists, the each of the one or more pick lists comprising at least a first common item of the one or more items and a route, and transferring the one or more pick lists to one or more mobile devices. In many embodiments, the method can further comprise receiving an indication from one of the one or more mobile devices that the first common item is not available, determining if a substitute item for the first common item is available, and updating at least a portion of the one or more pick lists based at least in part on the substitute item.

Figure 2:
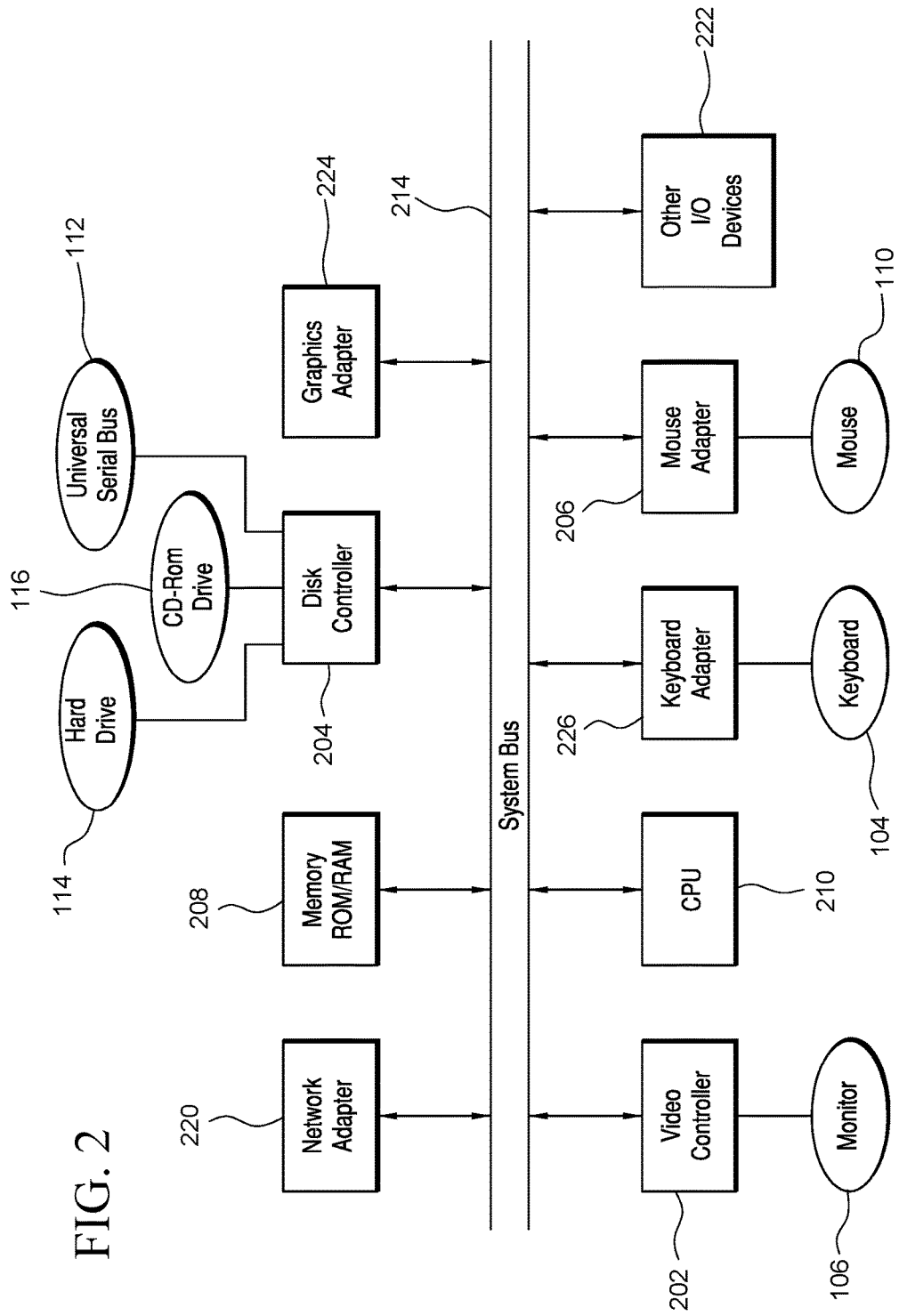
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
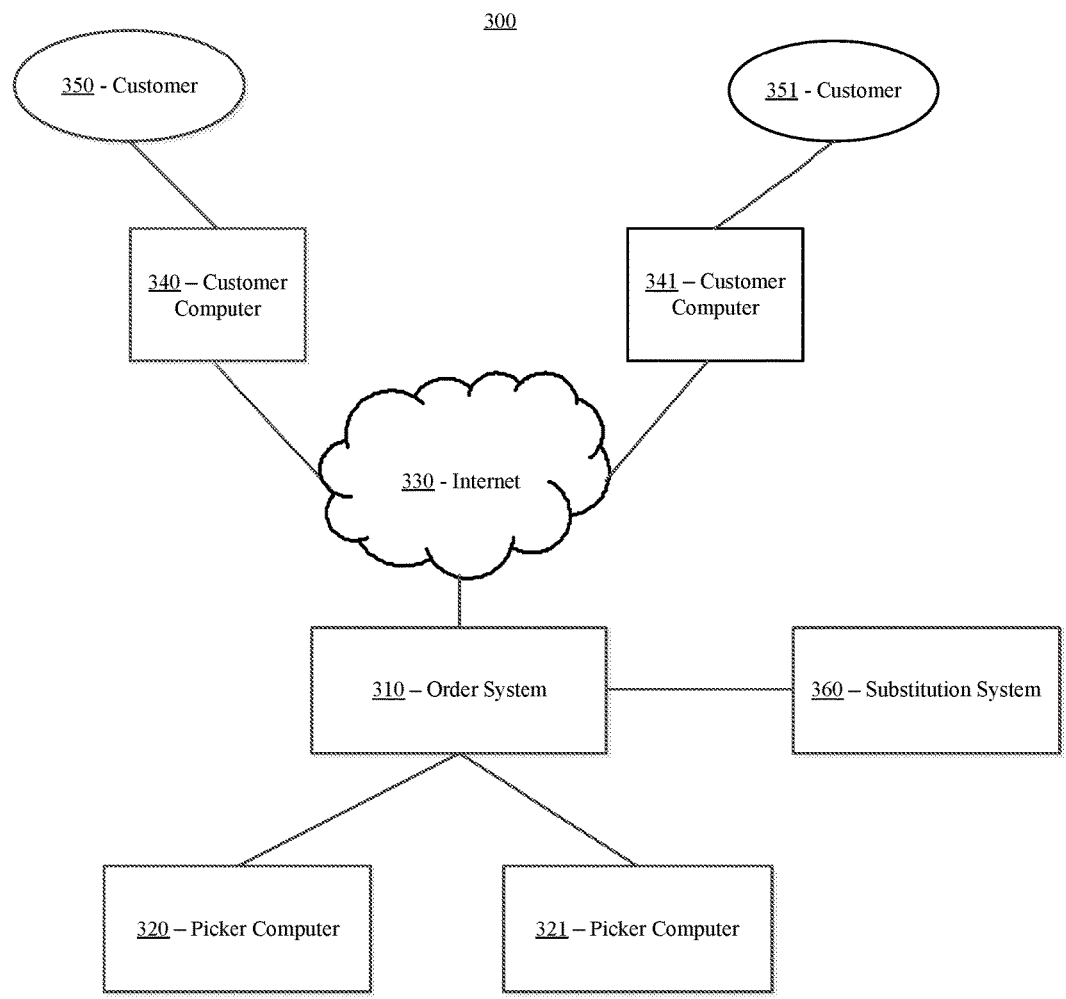
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In a number of embodiments, system 300 can comprise an order system 310 and a substitution system 360. In some embodiments, order system 310 and substitution system 360 can each be a computer system 100 (FIG. 1), as described above, and can each be a single computer, a single server, or a cluster or collection of computers or servers. In some embodiments, order system 310 can be in communication with an inventory system (not shown) which can track distinct items (e.g., stock keeping units (SKUs)) which can be ordered through the online retailer and which can be housed at one or more warehouses. In many embodiments, warehouses can comprise brick-and-mortar stores, distribution centers, or other storage facilities.

In many embodiments, system 300 also can comprise one or more picker computers 320 and 321. In some embodiments, picker computers 320 and 321 can be mobile electronic devices, computers, or a kiosk located in the warehouse. In many embodiments, a picker uses picker computer 320 to track a pick list and route through the warehouse to fulfill the pick list. As discussed further below, the picker can use picker computer 320 to provide feedback to order system 310. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, order system 310, substitution system 360, and/or picker computers 320 and 321 can each comprise one or more input devices (e.g., one or more keyboards, one or more keypads, one or more pointing devices such as a computer mouse or computer mice, one or more touchscreen displays, microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of order system 310, substitution system 360, and/or picker computers 320 and 321 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of order system 310, substitution system 360, and/or picker computers 320 and 321. In a similar manner, the processing module(s) and the memory storage module(s) can be local and/or remote to each other.

In many embodiments, order system 310 can be configured to communicate with one or more customer computers 340 and 341. In some embodiments, customer computers 340 and 341 also can be referred to as user computers. In some embodiments, order system 310 can communicate or interface (e.g. interact) with one or more customer computers (such as customer computers 340 and 341) through a network or internet 330. Internet 330 can be an intranet that is not open to the public. Accordingly, in many embodiments, order system 310 can refer to a back end of system 300 operated by an operator and/or administrator of system 300, and customer computers 340 and 341 can refer to a front end of system 300 used by one or more customers 350 and 351, respectively. In some embodiments, customers 350 and 351 also can be referred to as users. In these or other embodiments, the operator and/or administrator of system 300 can manage order system 300, the processing module(s) of order system 300, and/or the memory storage module(s) of order system 300 using the input device(s) and/or display device(s) of order system 300.

Meanwhile, in many embodiments, order system 310 and substitution system 360 also can be configured to communicate with one or more databases. The one or more database can comprise a product database that contains information about products sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s) and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between order system 310, substitution system 360, picker computers 320 and/or 321, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

Figure 4:
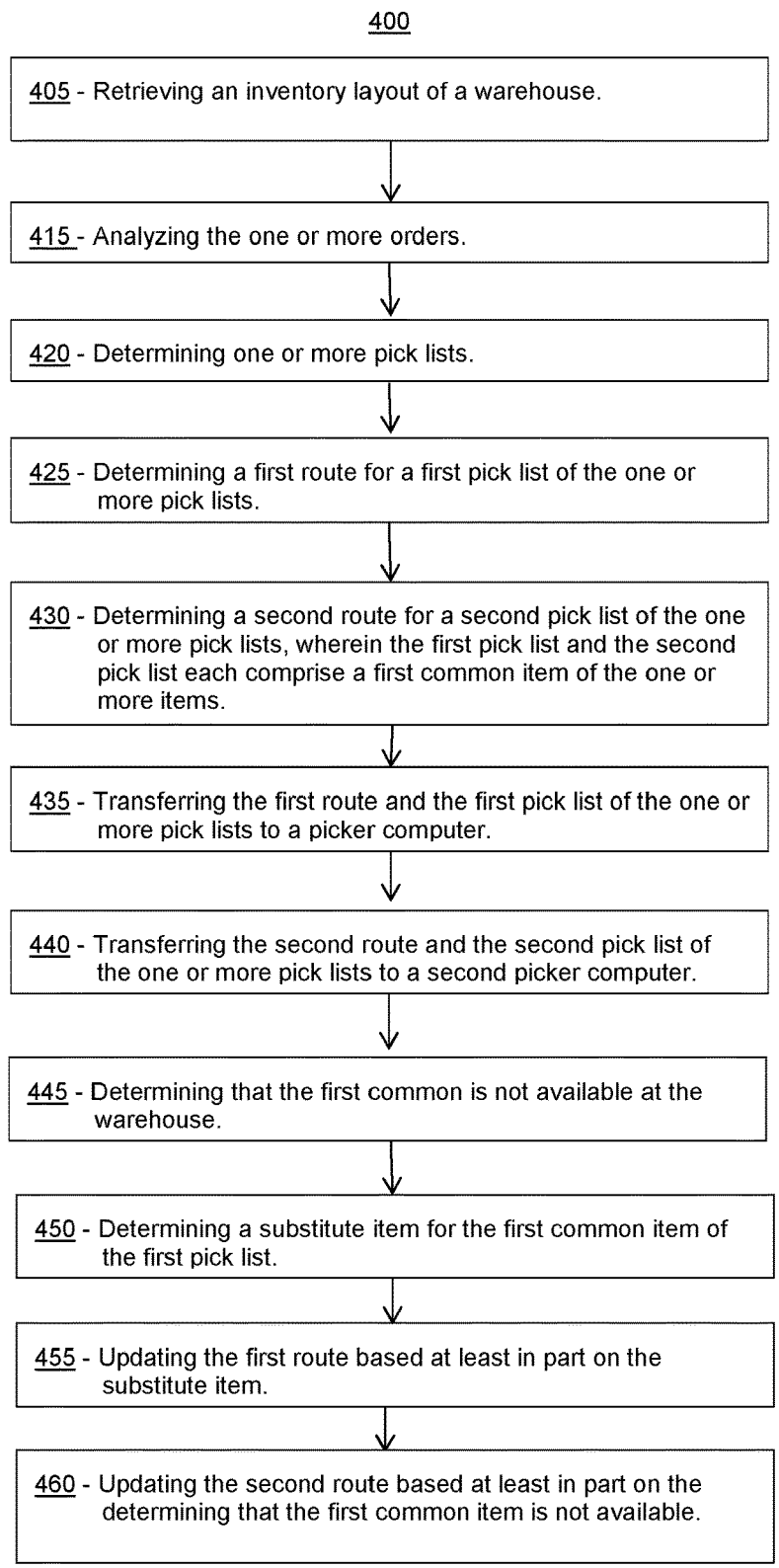
FIG. 4 is a flowchart for a method, according to an embodiment.
Figure 7:
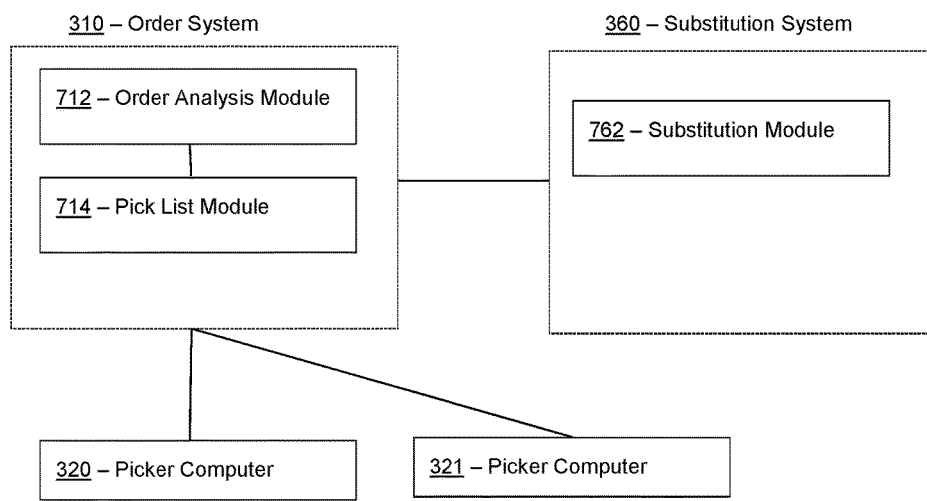
FIG. 7 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 712, 714, or 762 (FIG. 7). Such non-transitory memory storage modules can be part of a computer system such as order system 310 (FIG. 3) and/or substitution system 360 (FIG. 3). The processing module(s) can be similar or identical to the processing module(s) described above with respect to computer system 100 (FIG. 1).

Method 400 can comprise an activity 405 of retrieving an inventory layout of a warehouse. As discussed above, in some embodiments the warehouse can comprise brick-and-mortar stores, distribution centers, or other storage facilities. In many embodiments, the inventory layout of the warehouse can comprise a mapping of all the items (e.g., SKUs) that the warehouse stores, manages, and/or maintains. For example, the inventory layout can comprise a map of which SKUs are located on which shelves within which rows or aisles within the warehouse.

Method 400 can further comprise an activity 410 of receiving a request for one or more orders. In many embodiments, each of the one or more orders can comprise one or more items. In some embodiments, at least a portion of the one or more items are available at the warehouse.

In a number of embodiments, method 400 also can comprise an activity 415 of analyzing the one or more orders. In some embodiments, the one or more orders can be received from a website. In other embodiments, the one or more orders can be received from a phone ordering system. In many embodiments, activity 415 of analyzing the one or more orders can comprise organizing the one or more items according to a class. In some embodiments, the class can comprise item size, item shape, a weight range, a temperature range, a location in the warehouse, or a product type. In many embodiments, item size and/or item shape can be used such that like sizes and shapes are in the same class. In some embodiments, the weight ranges can comprise 0-2 pounds, 2-5 pounds, 6-10 pounds, or above 10 pounds. In other embodiments, the weight ranges can comprise less than 1 pound, 1-5 pounds, or above 5 pounds. In still other embodiments, the weight ranges can comprise weights that require only one person in order to lift the item, more than one person required in order to lift the item, or a machine in order to lift the item. In many embodiments, the temperature range can correspond to items required to be in ambient or room temperature, refrigerator temperature, or freezer temperature. In various embodiments, the location in the warehouse can comprise a location on a grid or warehouse layout, a level location, or a shelf location. In many embodiments, the product type can comprise a grocery, home furnishings, electronics, cleaning supplies, or seasonal items.

In many embodiments, method 400 further comprises an activity 420 of determining one or more pick lists. In some embodiments, activity 420 of determining one or more pick lists comprises determining the one or more pick lists based at least in part on the analysis of the one or more orders and the inventory layout of the warehouse. In many embodiments, the one or more pick lists comprise at least one common item of the one or more items. In a number of embodiments, determining one or more pick lists can comprise applying one or more pick list rules. In some embodiments, the one or more pick list rules can comprise picking items in a particular order, picking items in the same or similar class together in the same pick list, or not picking certain items together in the same pick list. In some embodiments, picking items in the particular order can comprise picking heavier items first (e.g., picking potatoes before bread). In many embodiments, picking items in the same or similar class comprises picking a class of items as described above together (e.g., produce or freezer items). In some embodiments, not picking certain items together in the same pick list can comprise not picking items in different classes together (e.g., frozen items with hot cooked items or cleaning products with groceries). In some or all of these embodiments, a single order from a single customer can be divided into multiple pick lists, or can be included in its entirety in a single pick list. Furthermore, when a single picker is fulfilling multiple pick lists at a single time, the multiple pick lists can be from the same customer or can be from multiple customers.

In some embodiments, method 400 can comprise an activity 425 of determining a first route for a first pick list of the one or more pick lists. In some embodiments, the one or more pick lists comprise a route. In many embodiments, the first route can comprise a route through the warehouse which comprises the shortest distance and/or the shortest time to complete. In some embodiments, the first route is based at least in part on the inventory layout of the warehouse and the availability of the products on the pick list within the inventory of the warehouse.

In further embodiments, method 400 can comprise an activity 430 of determining a second route for a second pick list of the one or more pick lists. In many embodiments, the first pick list and the second pick list each comprise a first common item of the one or more items. Similar to the first route, the second route can comprise a route through the warehouse which comprises the shortest distance and/or the shortest time to complete. In some embodiments, the second route is based at least in part on the inventory layout of the warehouse and the availability of the products on the pick list within the inventory of the warehouse.

Method 400 can further comprise an activity 435 of transferring the first route and the first pick list of the one or more pick lists to a first picker computer, such as picker computer 320 (FIG. 3). In many embodiments, activity 435 of transferring the first route and the first pick list of the one or more pick lists to a first picker computer comprises transferring the first route to a first mobile device. Method 400 also can further comprise an activity 440 of transferring the second route and the second pick list of the one or more pick lists to a second picker computer, such as picker computer 321 (FIG. 3). In many embodiments, activity 440 of transferring the second route and the second pick list of the one or more pick lists to a second picker computer comprises transferring the second route to a second mobile device. In some embodiments, the first and second picker computer can be the same (e.g., a kiosk). In some embodiments, the first and second pick lists can be printed from the first, second, and/or same picker computer.

In many embodiments, method 400 further comprises an activity 445 of determining that the first common item is not available at the warehouse. In some embodiments, activity 445 of determining that the first common item is not available at the warehouse comprises receiving an indication from one or more the of the picker computers (e.g. picker computer 320 (FIG. 3)). In many embodiments, the picker computer is a mobile device that the picker uses to track a pick list and route within the warehouse. In some instances, while following the pick list and route, the picker might come across an item that is not available at the location indicated on the route. In some embodiments, the picker can input or indicate on the picker computer or mobile device that the item is not available.

In many embodiments, method 400 can further comprise an activity 450 of determining a substitute item for the first common item. In some embodiments, activity 450 of determining if the substitute item for the first common item can comprise determining a substitute item for the first common item. In many embodiments, determining the substitute item can comprise analyzing one or more rules and selecting the substitute item based on the one or more rules. In some embodiments, analyzing the one or more rules can be based at least in part on method 600 as described in FIG. 6, which is described below.

Continuing with FIG. 4, in further embodiments, method 400 can comprise an activity 455 of updating the first route based at least in part on the substitute item. In some embodiments, method 400 can update at least a portion of the one or more pick lists based at least in part on the substitute item. In some embodiments, the one or more pick lists can be updated before the first route is updated. In other embodiments, the first route can be updated before the one or more pick lists are updated, including immediately after the completion of activity 450. In some embodiments, the first route is updated to include the substitute item immediately, at the end of the first route, or the substitute item is inserted in the first route in an efficient manner in order to keep the first route within a particular distance or time.

In a number of embodiments, method 400 can further comprise an activity 460 of updating the second route based at least in part on the determination that the first common item is not available. Activity 460 can occur after activity 445 and before activity 450, after activity 450 and before activity 455, or after activity 455. In some embodiments, activity 460 of updating the second route based at least in part on the determination that the first common item is not available comprises updating the second route to include the substitute item. In some embodiments, the second route is updated to include the substitute item immediately, at the end of the second route, or the substitute item is inserted in the second route in an efficient manner in order to keep the second route within a particular distance or time. In some embodiments, method 460 can comprise an activity of determining if the substitute item can be used as a substitute for the first common item within the second pick list for the second route. In many embodiments, the activity of determining if the substitute item can be used as a substitute for the first common item for the second route can comprise analyzing one or more rules, such as the substitution rules in method 600 as discussed in FIG. 6 below. Continuing with FIG. 4, the outcome of the substitute product determination process within activity 460 for the second pick list might be a different from the outcome of the substitute product determination process within activity 455 for the first pick list, particularly if the first and second pick lists are for different customers who have different preferences.

Figure 5:
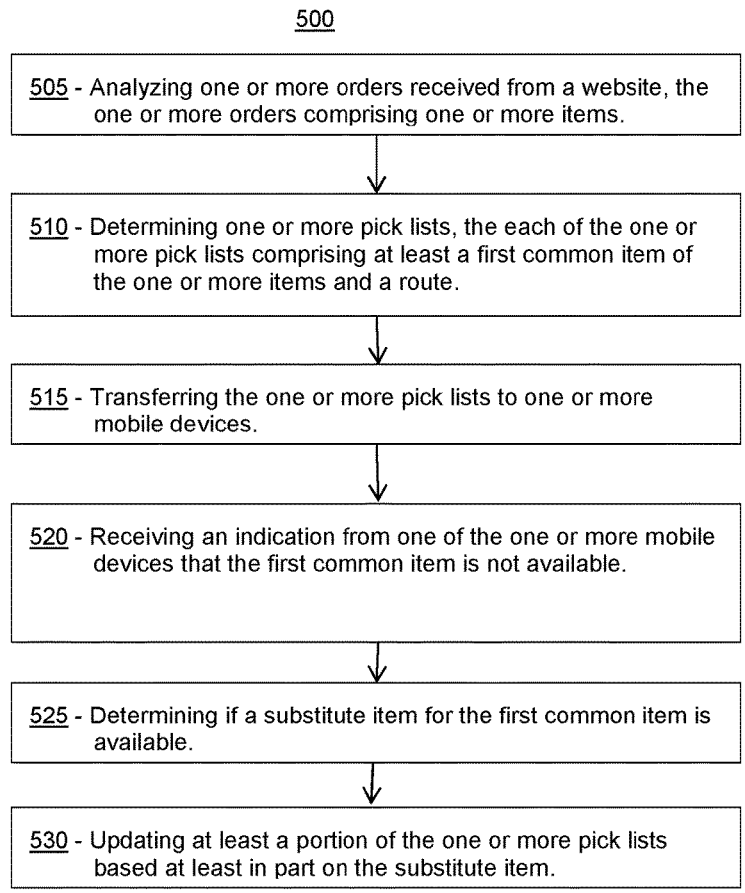
FIG. 5 illustrates a flowchart for a method, according to another embodiment.

Turning ahead in the drawings, FIG. 5 illustrates a flow chart for a method 500, according to another embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules 712, 714, or 762 (FIG. 7). Such non-transitory memory storage modules can be part of a computer system such as order system 310 (FIG. 3) and/or substitution system 360 (FIG. 3). The processing module(s) can be similar or identical to the processing module(s) described above with respect to computer system 100 (FIG. 1). In some embodiments, method 500 can be similar to method 400.

In many embodiments, method 500 can comprise an activity 505 of analyzing one or more orders received from a website. In many embodiments the one or more orders can comprise one or more items. In some embodiments, activity 505 can be similar to activities 405 (FIG. 4) and 410 (FIG. 4), and vice versa.

Method 500 can further comprise an activity 510 of determining one or more pick lists. In many embodiments, each of the one or more pick lists can comprise at least a first common item of the one or more items and a route. In some embodiments, the pick lists of method 500 can be similar to the pick lists of method 400 (FIG. 4). Activity 510 can be similar to activities 420 (FIG. 4) and/or 430 (FIG. 4), and vice versa.

In a number of embodiments, method 500 can comprise an activity 515 of transferring the one or more pick lists to one or more mobile devices. In some embodiments, method 500 can comprise an activity of transferring the one or more pick lists to any picker computer (e.g., picker computer 320 (FIG. 3)). In some embodiments, activity 515 can be similar to activity 440 (FIG. 4), and vice versa.

Method 500 can further comprise an activity 520 of receiving an indication from one of the one or more mobile devices that the first common item is not available. In some embodiments, method 500 can further comprise an activity 525 of determining if a substitute item for the first common item is available. In some embodiments, activity 525 of determining if a substitute item for the first common item is available can comprise analyzing one or more rules, such as the substitution rules in method 600 as discussed in FIG. 6 below.

In many embodiments, method 500 can comprise an activity 530 of updating at least a portion of the one or more pick lists based at least in part on the substitute item. In some embodiments, one or more activities 520, 525, and 530 can be similar to activity 460 (FIG. 4), and vice versa. In some embodiments, method 500 can further comprise activities of determining the one or more pick lists based at least in part on an inventory layout of a warehouse and/or determining if the substitute item can be used as a substitute for the first common item for the portion of the one or more pick lists.

Figure 6:
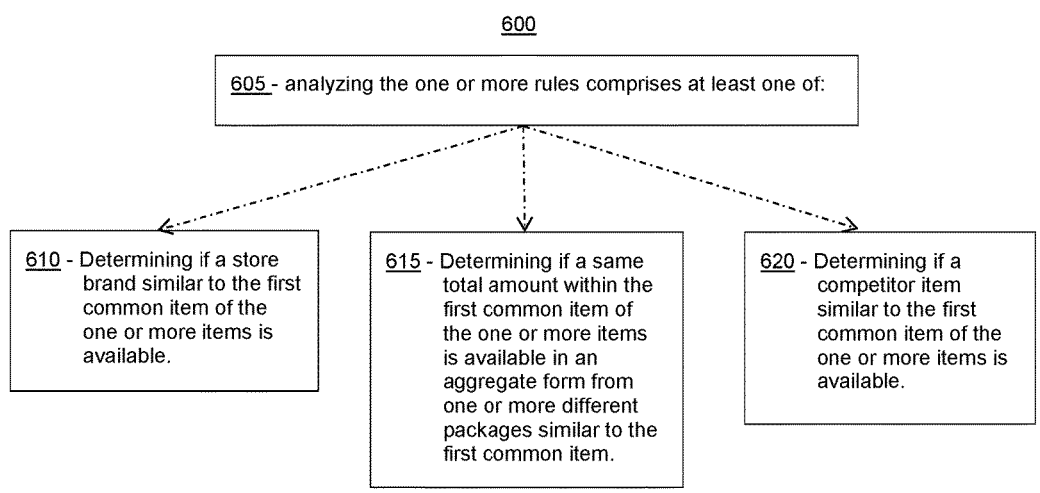
FIG. 6 is a flowchart for a substitution method, according to an embodiment.

FIG. 6 illustrates a flow chart for a method 600, according to another embodiment. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In many embodiments, system 300 (FIG. 3) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules 762 (FIG. 7). Such non-transitory memory storage modules can be part of a computer system such as order system 310 (FIG. 3) and/or substitution system 360 (FIG. 3). The processing module(s) can be similar or identical to the processing module(s) described above with respect to computer system 100 (FIG. 1).

In many embodiments, method 600 can comprise an activity 605 of analyzing one or more rules by at least one of activities 610, 615, and/or 620. Activity 610 comprises determining if a store brand similar to the first common item is available. Activity 615 can comprise determining if a same total amount within the first common item is available in an aggregate form from one or more different packages similar to the first common item. Activity 620 can comprise determining if a competitor item similar to the first common item is available.

In many embodiments, determining if a store brand or competitor item is similar to the first common item is available can comprise comparing item size, item description, item weight, amount or number of products contained within the item, or the brand of the item. In some embodiments, comparing item size can comprise finding a substitute item that has a comparable size to the first common item that is not available (e.g., a 50 ounce container versus a 52 ounce container). In many embodiments, the substitute item can be used if it is within 2%, 5%, or 10% of the size of the first common item. In some embodiments, a larger sized item that is similar to the first common item can be used as the substitution. In some embodiments, the larger sized item can be sold at a price of the originally-requested item, if the price of the originally-requested item is lower. In some embodiments, comparing the item description can comprise finding a substitute item that has a similar description to the originally-requested item that is not available (e.g., mandarin oranges vs. clementine oranges). In some embodiments, the substitute item can be used if it is a varietal of the originally-requested item or has a description that comprises at least in part a portion of the description of the item. In some embodiments, comparing the amount or number of products contained within the originally-requested item can comprise comparing to see if the substitute item has an equal or comparable number if products contained within the substitute item or comparing to determine if more than one substitute items can be used to equal the number of products within the first common item (e.g., two 6 packs of soda substituted for a single 12 pack case of soda of the same or similar brand). In many embodiments, comparing the brand of the originally-requested item can comprise comparing to determine if the substitute item is the same brand as the originally-requested item or comparing to determine if the brand of the substitute item is an approved brand substitution.

In some embodiments, method 600 can comprise an activity of determining if the customer allows substitution. In some embodiments, method 600 can comprise providing a coupon, discount, free items, or free delivery (or other incentives) if the customer allows substitutions. In many embodiments, if the customer allows substitutions on all items, the customer can receive at least a portion of those substituted items for free or at a discount. In some embodiments, if the customer provides an approved substitution on the order, the customer can receive the substitution at a lower price. In some embodiments, the customer might allow substitutions for some products, but not other products. In the same or different embodiments, the customer might allow only certain substitutions (instead of all or any substitutions) such as only a single competitor brand substitution for a particular product, but not the generic store brand or other competitor brand substitutions.

FIG. 7 illustrates a block diagram of a portion of system 300 comprising order system 310, picker computers 320 and 321, and substitution system 360, according to the embodiment shown in FIG. 3. Order system 310, picker computers 320 and 321, and substitution system 360 each are merely exemplary and are not limited to the embodiments presented herein. Order system 310, picker computers 320 and 321, and substitution system 360 each can be employed in many different embodiments or examples not specifically depicted or described herein. In some embodiments, certain elements or modules of order system 310, picker computers 320 and 321, and substitution system 360 can perform various procedures, processes, and/or acts. In other embodiments, the procedures, processes, and/or acts can be performed by other suitable elements or modules.

In many embodiments, order system 310 can comprise non-transitory memory storage modules 712 and 714 and substitution system 360 can comprise a non-transitory memory storage module 762. Memory storage module 712 can be referred to as an order analysis module 712, and memory storage module 714 can be referred to as a pick list module 714. Memory storage module 762 can be referred to as a substitution module 762. In many embodiments, order analysis module 712 can store computing instructions configured to run on one or more processing modules and perform one or more acts of methods 400 (FIG. 4), and/or 500 (FIG. 5) (e.g., act 405 of retrieving an inventory layout of the warehouse (FIG. 4), or act 415 of analyzing the one or more orders (FIG. 4)). In some embodiments, pick list module 714 can store computing instructions configured to run on one or more processing modules and perform one or more acts of methods 400 (FIG. 4) and/or 500 (FIG. 5) (e.g., act 420 determining one or more pick lists (FIG. 4)). In many embodiments, substitution module 762 can store computing instructions configured to run on one or more processing modules and perform one or more acts of methods 400 (FIG. 4), 500 (FIG. 5) and/or 600 (FIG. 6) (e.g., act 610 of determining if a store brand similar to the first common item of the one or items is available (FIG. 6)).

Although systems and methods for an order filling has been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the activities of FIGS. 3-7 may include different activities and/or be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A computer system for filling orders placed online through an electronic commerce website, the computer system comprising:
   one or more processors;
   one or more mobile devices; and
   one or more non-transitory computer-readable media configured to store computing instructions and the one or more processors configured to execute the computing instructions and perform:
      retrieving an inventory layout of a distribution center comprising at least a map of stock keeping units of items located on shelves, rows, or aisles;
      receiving a request for one or more orders, each of the one or more orders comprise one or more of the items, at least a portion of the one or more of the items are available at the distribution center;
      analyzing the one or more orders by comparing the one or more of the items in the one or more orders to products in a computerized product database;
      determining multiple pick lists based at least in part on analyzing the one or more orders and also based at least in part on the inventory layout of the distribution center;
      determining a first route for a first pick list of the multiple pick lists for a first customer, wherein the first route comprises a shortest distance or time to complete the first route based at least in part on the inventory layout of the distribution center and the availability at the distribution center of the one or more of the items on the first pick list;
      determining a second route for a second pick list of the multiple pick lists for a second customer, wherein the second route comprises a shortest distance or time to complete the second route based at least in part on the inventory layout of the distribution center and the availability at the distribution center of the one or more of the items on the second pick list, wherein the first pick list of the first customer and the second pick list of the second customer each comprise a first common item of the one or more of the items;

transferring the first route and the first pick list of the first customer of the multiple pick lists to a first mobile device of the one or more mobile devices, wherein the first mobile device is configured to communicate with an order system and a substitute system;

transferring the second route and the second pick list of the second customer of the multiple pick lists to a second mobile device of the one or more mobile devices, wherein the second mobile device is configured to communicate with the order system and the substitute system;

determining that the first common item is not available at the distribution center by at least receiving an indication from the first mobile device that the first common item is not available;

analyzing a first set of rules of the substitute system associated with the first customer for use in determining a first substitute item for the first common item of the first pick list of the first customer, wherein the first substitute item is determined by the first set of rules of the substitute system to be within a first predetermined percentage of a size of the first common item;

when the first substitute item is selected to replace the first common item, updating the first route based at least in part on including the first substitute item in the first pick list of the first customer; and automatically updating the second route based at least in part on determining that the first common item is not available for the first pick list of the first customer, wherein updating the second route occurs before receiving an indication from the second mobile device that the first common item is not available for the second pick list of the second customer, and by analyzing a second set of rules of the substitute system associated with the second customer for use in determining a second substitute item, wherein the second substitute item is determined to be within a second predetermined percentage of the size of the first common item.

2. The computer system of claim 1, wherein the computing instructions are further configured to perform:
determining whether the second substitute item can be used as a substitute for the first common item for the second pick list of the second customer, wherein the second substitute item comprises the first substitute item.

3. A method comprising:
retrieving, with a computer system using one or more processors, an inventory layout of a distribution center comprising at least a map of stock keeping units of items located on shelves, rows, or aisles;
receiving, with the computer system, a request for one or more orders, each of the one or more orders comprising one or more of the items, wherein at least a portion of the one or more of the items are available at the distribution center;
analyzing, with the computer system, the one or more orders by comparing the one or more of the items in the one or more orders to products in a computerized product database;
determining, with the computer system, multiple pick lists based at least in part on analyzing the one or more orders and also based at least in part on the inventory layout of the distribution center;

determining, with the computer system, a first route for a first pick list for a first customer of the multiple pick lists wherein the first route comprises a shortest distance or time to complete the first route based at least in part on the inventory layout of the distribution center and the availability at the distribution center of the one or more of the items on the first pick list;

determining, with the computer system, a second route for a second pick list of a second customer of the multiple pick lists, wherein the second route comprises a shortest distance or time to complete the second route based at least in part on the inventory layout of the distribution center and the availability at the distribution center of the one or more of the items on the second pick list, wherein the first pick list for the first customer and the second pick list of the second customer each comprise a first common item of the one or more of the items;

transferring, with the computer system, the first route and the first pick list for the first customer of the multiple pick lists to a first mobile device of one or more mobile devices, wherein the first mobile device is configured to communicate with an order system and a substitute system;

transferring, with the computer system, the second route and the second pick list of the second customer of the multiple pick lists to a second mobile device of the one or more mobile devices, wherein the second mobile device communicates with the order system and the substitute item;

determining, with the computer system, that the first common item is not available at the distribution center by at least receiving an indication from the first mobile device that the first common item is not available;

analyzing a first set of rules of the substitute system associated with the first customer for use in determining, with the computer system, a first substitute item for the first common item of the first pick list for the first customer, wherein the first substitute item is determined by the first set of rules of the substitute system to be within a first predetermined percentage of a size of the first common item;

when the first substitute item is selected to replace the first common item, updating, with the computer system, the first route based at least in part on including the first substitute item in the first pick list for the first customer; and automatically updating, with the computer system, the second route based at least in part on determining that the first common item is not available for the first pick list for the first customer, wherein updating the second route occurs before receiving an indication from the second mobile device that the first common item is not available for the second pick list of the second customer, and by analyzing a second set of rules of the substitute system associated with the second customer for use in determining a second substitute item, wherein the second substitute item is determined to be within a second predetermined percentage of the size of the first common item.

4. The method of claim 3, further comprising:
determining, with the computer system, whether the second substitute item can be used as a substitute for the first common item for the second pick list of the second customer, wherein the second substitute item comprises the first substitute item.

5. The method of claim 3, wherein:
updating, with the computer system, the second route comprises updating the second pick list of the second customer to include the second substitute item.

6. The method of claim 3, wherein:
analyzing, with the computer system, the one or more orders comprises organizing the one or more of the items according to a class.

7. The method of claim 6, wherein:
the class comprises:
a weight range.

8. A method of filling orders placed online through an electronic commerce website, the method comprising:
retrieving, with a computer system, an inventory layout of a distribution center comprising at least a map of stock keeping units of items located on shelves, rows, or aisles;
receiving, with the computer system, a request for one or more orders, each of the one or more orders comprising one or more of the items, wherein at least a portion of the one or more of the items are available at the distribution center;
analyzing, with the computer system, the one or more orders received from the electronic commerce website, by comparing the one or more of the items in the one or more orders to products in a computerized product database, including organizing the one or more of the items according to a class;
determining, with the computer system, multiple pick lists based at least in part on analyzing the one or more orders and based at least in part on the inventory layout of the distribution center, each of the multiple pick lists comprising at least a first common item of the one or more of the items;
determining, with the computer system, a first route for a first pick list for a first customer of the multiple pick lists wherein the first route comprises a shortest distance or time to complete the first route based at least in part on the inventory layout of the distribution center and the availability at the distribution center of the one or more of the items on the first pick list;
determining, with the computer system, a second route for a second pick list of a second customer of the multiple pick lists, wherein the second route comprises a shortest distance or time to complete the second route based at least in part on the inventory layout of the distribution center and the availability at the distribution center of the one or more of the items on the second pick list, wherein the first pick list for the first customer and the second pick list of the second customer each comprise the first common item of the one or more of the items;
transferring, with the computer system, the first route and the first pick list for the first customer of the multiple pick lists to a first mobile device of one or more mobile devices, wherein the first mobile device is configured to communicate with an order system and a substitute system;
transferring, with the computer system, the second route and the second pick list of the second customer of the multiple pick lists to a second mobile device of the one or more mobile devices, wherein the second mobile device communicates with the order system and the substitute system;
receiving, with the computer system, at least an indication from the first mobile device of the one or more mobile devices that the first common item is not available;
determining, with the computer system, whether a first substitute item for the first common item is available at the distribution center, wherein:
determining whether a store brand similar to the first common item is available at the distribution center; or
determining whether a same total amount within the first common item is available at the distribution center in an aggregate form from one or more different packages similar to the first common item; or
determining whether a competitor item similar to the first common item is available at the distribution center;
analyzing a first set of rules of the substitute system associated with the first customer for use in determining a first substitute item for the first common item of the first pick list of the first customer, wherein the first substitute item is determined by the first set of rules of the substitute system to be within a first predetermined percentage of a size of the first common item;
when the first substitute item is selected to replace the first common item, updating, with the computer system, the first route based at least in part on including the first substitute item in the first pick list for the first customer; and
automatically updating, with the computer system, the second route based at least in part on determining that the first common item is not available for the first pick list for the first customer, wherein updating the second route occurs before receiving an indication from the second mobile device that the first common item is not available for the second pick list of the second customer, and by analyzing a second set of rules of the substitute system associated with the second customer for use in determining a second substitute item, wherein the second substitute item is determined to be within a second predetermined percentage of the size of the first common item.

9. The method of claim 8, wherein:
determining, with the computer system, the multiple pick lists comprises determining the multiple pick lists based at least in part on the inventory layout of the distribution center and one or more pick list rules comprising picking the items in a particular order or picking the items in a same or similar class.

10. The method of claim 8, further comprising:
determining, with the computer system, whether the second substitute item can be used as a substitute for the first common item for the second pick list of the second customer of the multiple pick lists.

11. The method of claim 8, further comprising:
updating, with the computer system, at least a portion of the multiple pick lists before the first route is updated to include the first substitute item.

12. The method of claim 8, wherein:
determining, with the computer system, whether the first substitute item for the first common item is available at the distribution center comprises:
selecting the first substitute item.

13. The method of claim 8, wherein:
the class comprises at least one of:
a weight range;
a temperature range; or
a product type.

14. The computer system of claim 1, wherein:
the first mobile device is a wearable user computer device comprising at least an electronic device capable of presenting audio and/or visual data.

15. The computer system of claim 1, wherein:
the second mobile device comprises a head mountable wearable user computer device or a limb mountable wearable user computer device.

16. The method of claim 6, wherein:
the class comprises:
   a temperature range.

17. The method of claim 6, wherein:
the class comprises:
   a product type.

18. The computer system of claim 1, wherein the one or more mobile devices comprise one or more picker computers.

19. The method of claim 3, wherein the one or more mobile devices comprise one or more picker computers.

20. The method of claim 8, wherein the one or more mobile devices comprise one or more picker computers.

\* \* \* \* \*